United States Patent [19]

Coleman

[11] 4,293,008
[45] Oct. 6, 1981

[54] RATIO GRADUATE FOR USE WITH POST-MIX BEVERAGE DISPENSER

[75] Inventor: Charles E. Coleman, Atlanta, Ga.

[73] Assignee: The Coca-Cola Company, Atlanta, Ga.

[21] Appl. No.: 101,523

[22] Filed: Dec. 10, 1979

[51] Int. Cl.³ .......................... B67D 5/22; B65B 1/04
[52] U.S. Cl. ........................................ 141/95; 73/427; 141/325; 222/129.1
[58] Field of Search .................... 73/427; 141/95, 325; 137/597; 206/219; 220/23.8; 222/129.1

[56] References Cited

U.S. PATENT DOCUMENTS

| | | | |
|---|---|---|---|
| 2,982,446 | 5/1961 | Liolios et al. | 222/145 |
| 3,831,453 | 8/1974 | McWorter | 73/427 |
| 3,948,105 | 4/1976 | Johnson, Jr. | 73/427 |
| 3,988,857 | 11/1976 | Baumann | 141/95 X |
| 4,062,228 | 12/1977 | Peak | 73/427 |

FOREIGN PATENT DOCUMENTS 938442 10/1963 United Kingdom .................. 141/95

*Primary Examiner*—Daniel M. Yasich
*Attorney, Agent, or Firm*—Birch, Stewart, Kolasch & Birch

[57] ABSTRACT

A water/syrup ratio graduate for use with a post-mix beverage dispensing system is described. The graduate includes two fluid receiving chambers, one of which receives water (carbonated or still) from a post-mix dispenser nozzle and the other of which receives syrup from the nozzle. One of the chambers has maximum and minimum fluid level marks thereon and when the liquid level in that chamber is between the marks the water/syrup ratio can be read directly off a scale on the other chamber.

8 Claims, 2 Drawing Figures

RATIO GRADUATE FOR USE WITH POST-MIX BEVERAGE DISPENSER

BACKGROUND OF THE INVENTION

1. Field of Invention

The present invention relates to a ratio graduate for determining the water to syrup ratio of a postmix beverage. More specifically, the present invention relates to a ratio graduate which allows simple measurement of the postmix ratio in a postmix beverage dispensing system within a predetermined accuracy.

2. Description of Prior Art

Previously, multi-chambered cups have been used to measure the ratio of syrup to water in a postmix beverage dispensing system. These multi-chambered cups are normally used in connection with a common, well-known syrup separator such as the syrup separator disclosed in U.S. Pat. No. 2,982,446 to Liolios et al. A form of this multi-chambered cup is shown as syrup graduate 142 in FIG. 8 of the Liolios et al patent.

In the multi-chambered cup graduates of the type disclosed in the Liolios et al patent, a separate graduate must be provided for each syrup ratio. The syrup is adjusted to the correct ratio by adjusting the dispensing nozzle until the water and syrup levels are equal. One disadvantage of this system is the need to provide a different graduate for each water/syrup ratio.

This problem was corrected in another type of prior art graduate, also of the multi-chambered cup type, which has ratio graduations imprinted on one fluid chamber into which syrup is disposed and a water-level line imprinted on the other fluid chamber into which water is dispensed. Thus, the operator could fill the water chamber to a predetermined level and then read the water/syrup ratio from one of a series of syrup ratio graduations which corresponds to the level of the syrup in the syrup chamber.

One problem with this type of system is that it is difficult to determine the accuracy of the measurement. Also, it is difficult for the operator to turn off the water and syrup at precisely the proper moment to align the water level with the water-level line.

SUMMARY OF THE INVENTION

Accordingly, it is the primary object of the present invention to simplify the measurement of the water/syrup ratio in a postmix beverage dispensing system.

It is another object of the present invention to provide a syrup ratio graduate which can determine the water/syrup ratio with a predetermined accuracy.

It is a further object of the present invention to provide a syrup ratio graduate which compensates for the time delay between the turning off of the dispenser nozzle and the termination of the syrup and water flow.

The objects of the present invention are fulfilled in part by virtue of the inventor's discovery that placing both a minimum and a maximum mark on the water or syrup chamber makes it easier for the operator to determine when to shut off the dispenser nozzle and also insures that the water/syrup ratio is within a predetermined percentage of accuracy. Thus, the present invention includes a water chamber with a minimum fill-line and a maximum fill-line located thereon and a syrup chamber having a plurality of ratio graduations thereon which allow the operator to read the water/syrup ratio directly corresponding to the syrup level when the water level is between the minimum and maximum level lines.

BRIEF DESCRIPTION OF THE DRAWINGS

The objects of the present invention and the attendant advantages thereof will become more readily apparent by reference to the following drawings wherein.

DETAILED DESCRIPTION OF PREFERRED EMBODIMENTS

Figure 1:
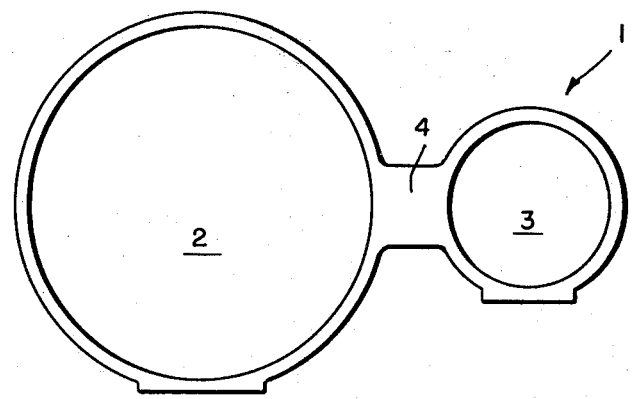
FIG. 1 is a top view of the ratio graduate of the present invention.
Figure 2:
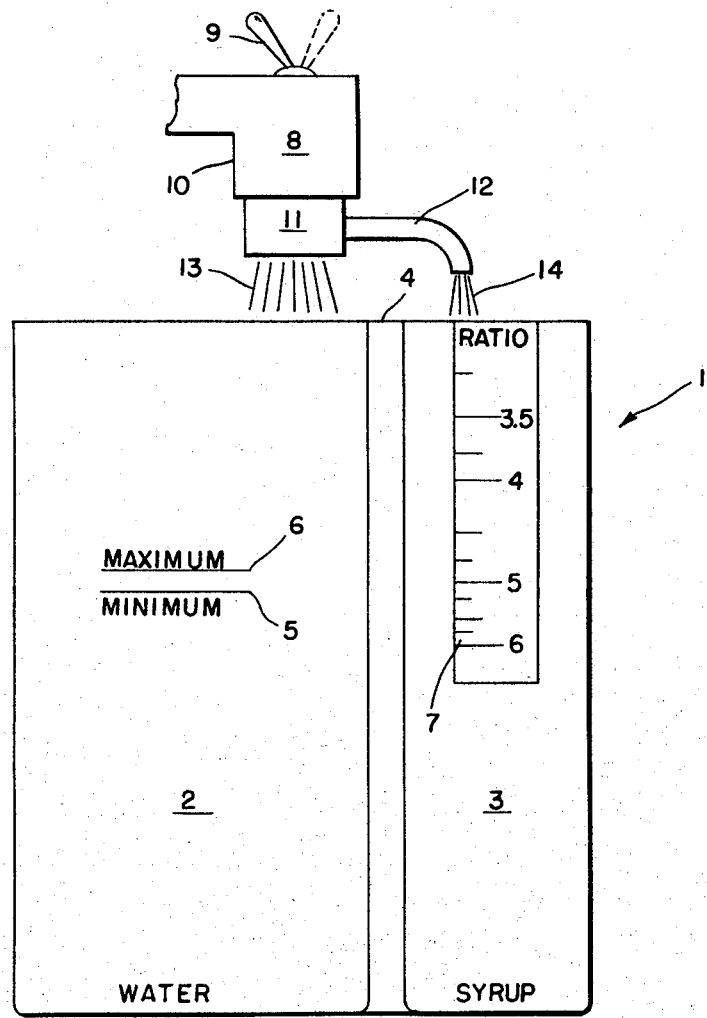
FIG. 2 is a side view of the ratio graduate of the present invention.

Referring in detail to FIGS. 1 and 2, there is illustrated a ratio graduate 1 including a cylindrical water chamber 2 and a cylindrical syrup chamber 3. The cylindrical water chamber 2 and the cylindrical syrup chamber 3 are connected together by a rib 4 located between the chambers. Chambers 2 and 3 and connecting rib 4 may be manufactured out of any suitable material which will allow the contents of the chambers to be seen through their cylindrical walls. In the preferred embodiment the ratio graduate may be formed of a transparent plastic.

Minimum line 5 and maximum line 6 are disposed on the cylindrical wall of water chamber 2. These markings may be made in any manner which would render them visible under ambient light conditions when the container is empty or full. Ratio markings 7 are disposed on the cylindrical wall of syrup chamber 3. These markings, too, may be made in any manner which would allow them to be visible when a syrup container is empty or full. Minimum line 5, maximum line 6, and the syrup ratio graduation 7 are all disposed on the ratio graduate in such a manner as to allow an operator to view all the markings simultaneously from one side of the ratio graduate.

FIG. 2 also shows a well-known syrup separator 10 attached to a dispensing nozzle 8. The dispensing nozzle includes an on-off control 9. The syrup separator 10 includes a water nozzle 11 for dispensing water 13 and a syrup nozzle 12 for dispensing syrup 14.

DESCRIPTION OF OPERATION

The ratio graduate of the present invention is designed to function in conjunction with any well-known syrup separator 10 such as the one disclosed in U.S. Pat. No. 2,982,466 to Liolios et al. The operator positions the ratio graduate 1 under the syrup separator 10 in such a manner that the water 13 from the water nozzle 11 of syrup separator 10 will flow into water chamber 2 and the syrup 14 from the syrup nozzle 12 of syrup separator 10 will flow into syrup chamber 3. The dispenser nozzle 8 is then turned on by on-off control 9 to simultaneously fill the water chamber 2 and the syrup chamber 3. When the water level reaches the minimum line 5, the operator quickly turns off the beverage dispenser nozzle 8 using on-off control 9.

When the water and syrup flow is terminated the water level should lie somewhere between the minimum line 5 and the maximum line 6. If the water level lies between these two lines, then the operator simply reads the water to syrup ratio from the ratio graduation 7. The operator is thus able to directly read the water/syrup ratio from graduation 7, knowing that this ratio will be within a predetermined accuracy since the water level is between the minimum and maximum markings 5, 6. In the preferred embodiment this ratio is indicative of the volume ratio of syrup to water.

It is to be understood, however, that the ratio graduation 7 could be calibrated to other measures based on volume. For example, if the density of the syrup is known, the ratio may be one of weight, rather than volume.

Not only does the present ratio graduate 1 assure that the water/syrup ratio is within a predetermined accuracy, the use of the minimum line 5 and maximum line 6 also makes it easier for the user to adjust the water level accurately. The system is designed so that when the user turns off the nozzle 8 when the water reaches the minimum line 5, the water level will reach a point approximately halfway between the minimum line 5 and the maximum line 6 by the time the water ceases to flow. Thus, the system accuracy is greatly increased.

It should be understood that the system described herein may be modified as would occur to one of ordinary skill in the art without departing from the spirit and scope of the present invention.

What is claimed:

1. In a system for measuring the volume ratio of a first fluid to a second fluid using a ratio graduate and an on-off valve means by dispensing the first fluid and second fluid into said graduate, the improvement comprising:
    said ratio graduate having;
    (a) a first fluid chamber for containing said first fluid having a minimum line and a maximum line disposed thereon at a predetermined distance from each other; and
    (b) a second fluid chamber for containing said second fluid adjacent to said first fluid chamber, said second fluid chamber having graduations indicative of various first fluid to second fluid volume ratios disposed thereon;
    (c) said minimum and maximum lines and said first fluid to second fluid ratio graduations being related such that when said first fluid is at a level between said minimum line and said miximum line, the first fluid to second fluid ratio may be read directly off said first fluid to second fluid ratio graduation to provide a first fluid to second fluid ratio within a predetermined accuracy determined by the predetermined distance between said minimum line and said maximum line, wherein said valve means is turned off to stop the flow of said first and second fluids when said first fluid level reaches said mimum line.

2. The system of claim 1 wherein the first fluid to second fluid ratio may be read within said predetermined accuracy if said first fluid level remains between said minimum line and said maximum line after the flow is terminated.

3. The system of claims 1 or 2 wherein said first fluid is water and said second fluid is beverage syrup; wherein said ratio graduate is for measuring the water to syrup ratio in a postmix beverage dispensing system; and
    wherein a separator nozzle is used to simultaneously dispense said water and said syrup.

4. The system of claims 1 or 2 wherein said first fluid is soda and said second fluid is beverage syrup;
    wherein said ratio graduate for measuring the soda to syrup ratio in a postmix beverage dispensing system; and
    wherein a separator nozzle is used to simultaneously dispense said soda and said syrup.

5. A system of measuring the volume ratio of water to syrup in a postmix beverage system by dispensing separated soda and syrup into a ratio graduate by using a separator attached to a dispensing valve, said ratio graduate comprising:
    a water chamber for containing said water having a minimum line and a maximum line disposed thereon at a predetermined distance from each other; and
    a syrup chamber for containing said syrup adjacent to said water chamber, said syrup chamber having graduations indicative of various water to syrup volume ratios disposed thereon;
    said minimum and maximum lines and said water to syrup ratio graduations being related such that when said water is at a level between said minimum line and said maximum line, the water to syrup ratio may be read directly off said water to syrup ratio graduations to provide a water to syrup ratio within a predetermined accuracy determined by predetermined distance between said minimum line and said maximum line;
    means for turning said dispensing valve off to stop the flow of water and syrup from said separator when said water level reaches said minimum line;
    said water to syrup ratio being read within said predetermined accuracy if said water level remains between said minimum line and said maximum line after the flow is terminated.

6. A method of measuring the volume ratio of a first fluid to a second fluid using an on-off valve means and a ratio graduate, the ratio graduate including,
    a first fluid chamber for containing said first fluid having a minimum line and a maximum line disposed thereon at a predetermined distance from each other,
    a second fluid chamber for containing said second fluid adjacent to said first fluid chamber, said second fluid chamber having graduations indicative of various first fluid to second fluid volume ratios disposed thereon,
    said minimum and maximum lines and said first fluid to second fluid ratio graduations being related such that when said first fluid is at a level between said minimum line and said maximum line, the first fluid to second fluid ratio may be read directly off said first fluid to second fluid ratio graduations to provide a first fluid to second fluid ratio within a predetermined accuracy determined by the predetermined distance between said minimum line and said maximum line,
    said method comprising the steps of:
    turning on said valve means to dispense said first and second fluids into said first and second fluid chambers, respectively;
    turning off said valve means to terminate the flow of said first and second fluids when said first fluid level reaches said minimum line; and
    reading the first fluid to second fluid ratio within a predetermined accuracy from said ratio graduations if said first fluid level remains between said minimum line and said maximum line.

7. The method of measuring of claim 6, wherein said first fluid is water and said second fluid is beverage syrup;

wherein said ratio graduate is for measuring the water to syrup ratio in a postmix beverage dispensing system; and wherein a separator nozzle is used to simultaneously dispense said water and said syrup.

8. The method of measuring of claim 6, wherein said first fluid is soda and said second fluid is beverage syrup;

wherein said ratio graduate for measuring the soda to syrup ratio in a postmix beverage dispensing system; and wherein a separator nozzle is used to simultaneously dispense said soda and said syrup.

* * * * *